United States Patent
Garcia Martinez et al.

(10) Patent No.: US 8,679,219 B2
(45) Date of Patent: Mar. 25, 2014

(54) PROCESS FOR PREPARING AN ELEMENTAL SULPHUR-CONTAINING FERTILIZER

(75) Inventors: Rafael Alberto Garcia Martinez, Calgary (CA); Klaas J Hutter, Pocatello, ID (US)

(73) Assignee: Shell Oil Company, Houston, TX (US)

( * ) Notice: Subject to any disclaimer, the term of this patent is extended or adjusted under 35 U.S.C. 154(b) by 13 days.

(21) Appl. No.: 13/319,230

(22) PCT Filed: Feb. 18, 2010

(86) PCT No.: PCT/EP2010/052042
§ 371 (c)(1), (2), (4) Date: Jun. 8, 2012

(87) PCT Pub. No.: WO2010/058038
PCT Pub. Date: May 27, 2010

(65) Prior Publication Data
US 2012/0272702 A1    Nov. 1, 2012

(30) Foreign Application Priority Data
May 7, 2009   (EP) ...................................... 09159679

(51) Int. Cl.
*C05D 9/00*    (2006.01)
*C05D 9/02*    (2006.01)

(52) U.S. Cl.
USPC ................ 71/31; 71/32; 71/33; 71/34; 71/63; 71/64.03

(58) Field of Classification Search
USPC ........................... 71/31, 32, 33, 34, 63, 64.03
See application file for complete search history.

(56) References Cited

U.S. PATENT DOCUMENTS

| 3,177,062 A | 4/1965 | Hignett et al. .................... 71/33 |
| 4,372,872 A | 2/1983 | Backlund ...................... 252/313 |
| 5,522,553 A | 6/1996 | LeClair et al. .................. 241/21 |

FOREIGN PATENT DOCUMENTS

| DE | 183147 | 3/1906 | |
| EP | 1560801 | 5/2004 | ................ C05B 7/00 |
| NZ | 213682 | 11/1988 | ................ B01F 3/12 |
| WO | WO 2004043878 | 5/2004 | ................ C05G 3/00 |
| WO | WO 2008089568 | 7/2008 | ............ C01B 17/027 |

OTHER PUBLICATIONS

Yalcin, et al; "A simulation study of sulphur grindability in a batch ball mill" Powder Technology 146; pp. 193-199; Sep. 2004.
Boswell, C.C. et al.; "The effects of different manufacturing techniques on the availability of sulfate to pasture from mixtures of elemental sulfur with either triple superphosphate or partially acidulated reactive phosphate rock"; Fertilizer Research, Kluwer Academic Publishers, vol. 44, No. 3; pp. 255-263; Jan. 1, 1996.

*Primary Examiner* — Wayne Langel
(74) *Attorney, Agent, or Firm* — Charles W. Stewart

(57) ABSTRACT

A process for preparing an elemental sulphur-containing fertilizer is disclosed. The process uses a dispersion mill, wherein a rotor turns within a slotted stator, to wet mill elemental sulphur in a liquid (preferably an aqueous liquid), thereby providing a dispersion of milled elemental sulphur in the liquid. The dispersion is combined with further components to provide a mixture of elemental sulphur and further components, and the mixture is granulated in a granulator unit to provide granulated elemental sulphur-containing fertilizer.

11 Claims, No Drawings

PROCESS FOR PREPARING AN ELEMENTAL SULPHUR-CONTAINING FERTILIZER

PRIORITY CLAIM

The present application claims priority from PCT/EP2010/052042, filed 18 Feb. 2010, which claims priority from European Application 09159679.1, filed 7 May 2009.

FIELD OF THE INVENTION

The present invention provides a process for the preparation of an elemental sulphur-containing fertilizer.

BACKGROUND OF THE INVENTION

Increased demand for sulphur-containing fertilizers stems from the discovery that low crop yields in certain cases may be related to deficiencies in sulphur in the soil. An example of a species with high sulphur requirements is Canola. Canola is an important cash crop in Alberta, Canada, and has high sulphur requirements at any growth stage. A shortage of sulphur can cause serious reductions in crop yield and quality.

Manufacturing processes for sulphur-containing fertilizers of the phosphate type often involve the use or incorporation of sulphates. A disadvantage of sulphates is that they are very mobile in the soil and easily leach out of the root zone, effectively making the sulphate nutrient unavailable to the plants.

Elemental sulphur is not leached out of the soil as readily as sulphates. Instead, micron-sized elemental sulphur particles (e.g. with size from 1 to 200 $\mu$m) are oxidized to sulphate sulphur, which is the form utilised by the plants, by soil bacteria during the cropping season. Elemental sulphur can therefore be considered a slow (timed) release form of plant nutrient sulphur that is less prone to leaching out of the crops root zone. It is, therefore, advantageous to have a large proportion of the sulphur in fertilizers present as elemental sulphur. Furthermore, elemental sulphur offers some additional benefits in agriculture, including acting as a fungicide against certain micro organisms, acting as a pesticide against certain soil and plant pests, assisting the decomposition of plant residues and improving phosphorus and nitrogen nutrient utilisation and reducing the pH of alkaline and calcareous soils.

Thus, it is advantageous to incorporate sulphur in sulphur-containing fertilizers as elemental sulphur.

Processes for the manufacture of sulphur-containing fertilizers, wherein elemental sulphur is used, are known in the art. NZ 213682 discloses a method for providing sulphur for use in a sulphur-containing fertilizer wherein liquid sulphur is added to phosphoric acid, wherein the phosphoric acid is in a high energy state of shear in a high energy vortex. This provides a dispersion of sulphur in phosphoric acid, which can be used in the formation of sulphur-containing triple superphosphate fertilizer. The sulphur dispersion is combined and reacted with phosphate rock, and the resulting material is granulated. U.S. Pat. No. 4,372,872 discloses a process wherein a suspension of sulphur is produced by agitating an aqueous medium with a high shear mixer, and introducing sulphur (in particulate or molten form) into the agitated medium. The sulphur suspensions can be applied to the soil. The present inventors have found that, with such methods of preparing sulphur for incorporation into fertilizer products, it is difficult to avoid providing relatively large sulphur particles and these larger particles lead to operational difficulties during fertilizer manufacture such as build-up of particles in the apparatus and possible plugging of the process equipment and process lines. Also, said relatively large sulphur particles are more difficult to incorporate into and bond to the other fertilizer material.

WO 2008/089568 discloses a method for wet grinding sulphur feedstock wherein hydrocyclones are used to separate elemental sulphur particles having selected size distributions. The product can be further processed to produce a sulphur-based fertilizer. In the examples of WO 2008/089568 a ball mill is used as a primary grinding stage and a Vertimill as a second grinding unit. A disadvantage of this wet grinding process is its process complexity (a number of pieces of process equipment is needed) and that the process is energy intensive. No mention of a dispersion mill is made.

Yalcin et al in Powder Technology 146 (2004), 193-199, describe a wet ball milling process for producing finely divided sulphur that can be used in a soil acidification process. Such milling processes require apparatus which may be complex and expensive as it must be corrosion resistant.

WO 2004/043878 discloses a process for the manufacture of sulphur-containing fertilizers comprising the steps of:
(a) mixing ammonia, phosphoric acid and water in a reactor unit to obtain an ammonium phosphate mixture;
(b) introducing the mixture obtained in step (a) into a granulator unit to obtain granules,
wherein a liquid phase comprising elemental sulphur is brought into contact with ammonia, phosphoric acid and water in the reaction unit in step (a) or is introduced in the granulator in step (b). No mention is made of milling the elemental sulphur.

U.S. Pat. No. 5,522,553 discloses a dispersion mill and more particularly a method and apparatus for producing liquid suspensions of finely divided matter, such as in the manufacture of paints, printing inks, lacquers, carbon paper coatings, in the treatment of waste water and the like. There is no suggestion in U.S. Pat. No. 5,522,553 to use the dispersion mill in a process for preparing an elemental sulphur-containing fertilizer.

The present inventors have sought to provide an alternative method for manufacturing elemental sulphur-containing fertilizer. In particular, the present inventors have sought to provide a simpler and less energy intensive process for manufacturing elemental sulphur-containing fertilizer.

In addition, the present inventors have sought to provide a process for manufacturing elemental sulphur-containing fertilizer, wherein the particle size of the elemental sulphur particles can be easily controlled.

SUMMARY OF THE INVENTION

Accordingly, the present invention provides a process for preparing an elemental sulphur-containing fertilizer, comprising steps of:
(a) using a dispersion mill, wherein a rotor turns within a slotted stator, to wet mill elemental sulphur in a liquid, thereby providing a dispersion of milled elemental sulphur in the liquid;
(b) combining the dispersion of milled elemental sulphur with further components to provide a mixture of elemental sulphur and further components; and
(c) granulating the mixture in a granulator unit to provide granulated elemental sulphur-containing fertilizer.

It has surprisingly been found that the process according to the present invention effectively incorporates elemental sulphur into fertilizer in a surprising simple way. Low amounts of sulphur dust are created within the granulation process, thereby improving the safety aspects of the process.

An important advantage of the process according to the present invention is that it enables to select and closely control (or manage) the size and size distribution of the sulphur particles in the fertilizer product, which is advantageous as the efficacy of the sulphur-enhanced fertilizer is affected by the sulphur particle size and particle size distribution. The actual size and size distribution of the sulphur particles in the fertilizer product can be selected for example dependent on the agricultural environments (e.g. soil and climatic conditions) for which the fertilizer is intended.

Also, it has been found that by using a dispersion mill, a relatively small amount of equipment and energy is needed (when compared with for example the process as disclosed in WO 2008/089568 as mentioned above); according to the present invention, the wet-milling of sulphur can be done in one single step, whilst other known wet-mill processes (as described in e.g. WO 2008/089568) require several steps to achieve the same without good control of the size and size distribution of the sulphur particles in the fertilizer product.

DETAILED DESCRIPTION OF THE INVENTION

In step (a) of the process of the invention, elemental sulphur in a liquid (preferably an aqueous liquid) is wet milled in a dispersion mill, wherein a rotor turns within a slotted stator, thereby providing a dispersion of milled elemental sulphur in the liquid. The liquid and elemental sulphur are drawn by the rotation of the rotor into the rotor/stator assembly, and are accelerated and expelled radially through the openings in the slotted stator. With each pass through the rotor/stator assembly, the elemental sulphur is subjected to a combination of mechanical and hydraulic shear such that the particles of elemental sulphur are reduced in size.

The rotor turns at very high speeds, preferably such that the tip speed is from 1500 to 3500 meters per minute, more preferably from 2000 to 3000 meters per minute. Higher tip speeds result in a higher energy input in the dispersion mill and result in a smaller average sulphur particle size. The speed should be sufficiently high to achieve the required particle size.

A preferred dispersion mill has a slotted rotor inside a slotted stator. When the rotor and stator slots come into alignment, the liquid and elemental sulphur are ejected from the rotor slots into the stator slots. Suitable dispersion mills are described in U.S. Pat. No. 5,522,553 and are available from Kady International, USA.

The elemental sulphur used in the fertilizer composition and process of the present invention can be obtained from any suitable source. In one embodiment of the present invention, the elemental sulphur is obtained from an industrial process, such as the removal of unwanted sulphur components from natural gas.

The elemental sulphur used may be high purity (>99.9% S) chemical sulphur as obtained from the Claus process. However, the process of the present invention can use elemental sulphur of significantly lower purity than this. Examples of such elemental sulphur containing materials are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur.

Sulphur may be added to the dispersion mill as molten sulphur or as solid sulphur, but is preferably added as solid sulphur because this avoids having to keep the sulphur at a high temperature (sulphur is molten above 120° C.). The sulphur is preferably added as pellets, e.g. rotoformed pellets of average size from 3 to 4 mm.

The liquid in step (a) may be chosen from a broad variety of liquids but is preferably an aqueous liquid. The aqueous liquid may be an acidic aqueous solution such as an aqueous solution of phosphoric acid or sulphuric acid, and is most preferably selected from an aqueous solution of phosphoric acid, an aqueous solution of ammonium phosphate, an aqueous solution of ammonium sulphate and a combination thereof. In case the liquid is an aqueous solution of phosphoric acid, the phosphoric acid preferably has a strength corresponding to from 1 to 60% of $P_2O_5$ in water, more preferably from 5 to 50%.

Preferably the aqueous liquid contains as little water as possible to avoid the introduction of excess process water; any excess water that is introduced into the fertilizer production process is to be eliminated at a later stage and thereby leads to a more complex and more energy intensive process.

The weight percentage of elemental sulphur based upon the combined weight of the sulphur and the aqueous liquid in step (a) is preferably from 10 to 70 wt. %, more preferably from 5 to 50 wt. %, even more preferably from 10 to 40 wt. %.

In one embodiment of the invention, one or more surfactants are added during step (a) or step (b). The surfactant(s) may be added to the liquid before the elemental sulphur is wet milled, or may be added to the dispersion of milled elemental sulphur before or during the combination with further components. The surfactants may help to further reduce the production of sulphur dust during fertilizer manufacture, may aid the granulation of the fertilizer in step (c) and may reduce the viscosity of the elemental sulphur dispersion produced in step (a) and/or elemental sulphur mixture produced in step (b). The surfactants could include cationic surfactants such as the ethylene oxide or propylene oxide adduct of an aliphatic amine, or could include anionic surfactants such as a lignosulphonate. Typically, the one or more surfactants are added in such an amount that the granulated elemental sulphur-containing fertilizer as produced in step (c) comprises from 0.001 to 5.0 wt. % surfactant, preferably from 0.10 wt. % to 1.5 wt. %, based on the total weight of the granulated fertilizer.

In a preferred batch process for carrying out step (a), the liquid is added to the dispersion mill first, the mill is started and then the sulphur is added over a relatively short period of time. The addition rate for the sulphur is preferably as fast as possible without overloading the mill.

The energy input during the milling can be expressed as power per volume or mass of sulphur processed, e.g. $kWh/m^3$ sulphur processed or kWh/ton sulphur processed. The energy input affects the size of the milled sulphur particles in the resulting dispersion, so is chosen according to the required particle size. Higher energy input provides smaller particle sizes. For a particular mill, higher energy input can be achieved by reducing the amount of sulphur that is milled. Preferably the energy input is from 10 (preferably above 20) to 1000 kWh/ton sulphur processed, more preferably from 50 to 100 kWh/ton sulphur processed, even more preferably from 65 to 85 kWh/ton sulphur processed. Part of this higher energy will be transferred to the dispersion being formed in step (a) as thermal energy thereby increasing the temperature thereof. Such temperature increase can be controlled using a suitable heat exchanger (possibly incorporated in the dispersion mill). Preferred temperatures for wet milling of elemental sulphur are between 0 and 120° C., more preferably between 15 and 80° C. In some embodiments, this temperature increase avoids any additional heating steps thereby saving energy and equipment costs.

An advantage of the process of the invention is that by controlling the parameters in step (a), specifically the size of slots in the stator and optionally the rotor, the tip speed of the rotor and the energy input, and/or the physical-chemical properties of the liquid (composition, temperature, viscosity), it is possible to control the particle size and particle size distribution of the resulting dispersion. It is important to be able to control the sulphur particle size because the particle size affects the effectiveness (rate of release) of the sulphur fertilizer. The rate of oxidation of the sulphur particles to sulphate is affected by the particle size, see e.g. Boswell et al, Fertilizer Research 35, 127-149, 1993. For different agricultural environments with different soils and climatic conditions, it may be desirable to have different sulphur particle size distributions in order to achieve effective oxidation of sulphur particles and release of sulphate. Therefore, the present invention enables the skilled person to produce elemental sulphur-containing fertilizer with sulphur particle size tailored for a specific agricultural environment.

The inventors also believe that the present invention provides sulphur particles with a shape that has a higher surface area to volume ratio than the substantially spherical particles produced in other processes such as (wet) prilling processes. Particles with a high surface area to volume ratio are preferred because oxidation of sulphur will be faster with a higher surface area (see Watkinson et al, Fertilizer Research 35, 115-126, 1993). Additionally, sulphur particles with a high surface area to volume ratio may also have better wettability such that they are more readily incorporated into sulphur fertilizer with better adhesion and less generation of sulphur dust during the granulation step (c).

In one embodiment of the invention, the elemental sulphur-containing fertilizer is a sulphur—triple super phosphate fertilizer, in step (a) the liquid is an aqueous solution of phosphoric acid, and in step (b), the dispersion of milled elemental sulphur in phosphoric acid solution is mixed and reacted with phosphate rock, thereby providing a mixture of sulphur and soluble calcium phosphate. In step (a), the phosphoric acid preferably has a strength of from 5 to 60 wt. % $P_2O_5$, more preferably from 10 to 50 wt. % $P_2O_5$ and the resulting dispersion of milled sulphur in phosphoric acid preferably comprises from 1 to 60 wt. % sulphur and from 5 to 55 wt. % $P_2O_5$ based upon the weight of the dispersion, more preferably from 20 to 40 wt. % sulphur and from 10 to 50 wt. % $P_2O_5$. In step (b), the relative amounts of the phosphate rock and the dispersion of elemental sulphur in phosphoric acid are preferably set such that the R ratio (the ratio of $P_2O_5$ from the phosphate rock to $P_2O_5$ from phosphoric acid) is from 2.0 to 2.8 (this will vary with the quality of the phosphate rock and phosphoric acid). In step (b) the dispersion of milled elemental sulphur is combined with phosphate rock using methods known to the skilled person. For example, to manufacture non-granular triple super phosphate (which is used as an intermediate for production of compound fertilizer by granulation processes), the dispersion of milled elemental sulphur can be combined with phosphate rock in a suitable mixer such as a cone mixer. Alternatively, to manufacture granular triple super phosphate, finely ground phosphate rock (e.g. 80% passing 200 mesh) is preferably combined with the dispersion of milled elemental sulphur at 90 to 105° C. (possibly with the addition of steam to attain these temperatures) in a reactor that is preferably agitated.

In another embodiment of the invention, the elemental sulphur-containing fertilizer is a sulphur—monoammonium phosphate, sulphur diammonium phosphate or sulphur—nitrogen/phosphorus/potassium fertilizer, in step (b) the dispersion of milled elemental sulphur in liquid is mixed and reacted with ammonia, thereby providing a mixture of sulphur and ammonium phosphate. In step (a), preferably an aqueous solution of phosphoric acid is used as the liquid and preferably has a strength of from 5 to 60 wt. % $P_2O_5$, more preferably from 10 to 50 wt. % $P_2O_5$ and the resulting dispersion of milled sulphur in phosphoric acid preferably comprises from 1 to 60 wt. % sulphur and from 5 to 55 wt. % $O_2O_5$ based upon the weight of the dispersion, more preferably from 20 to 50 wt.% (preferably below 40 wt. %) sulphur and from 10 to 50 wt. % $P_2O_5$. In step (b), the amount of ammonia is determined by the required product. For the production of sulphur—monoammonium phosphate, the molar ratio of ammonia and phosphoric acid is typically kept between values of from 0.5 to 1.0. For the production of sulphur diammonium phosphate the molar ratio of ammonia and phosphoric acid is typically kept between values of from 1.2 to 2.0. For the production of sulphur—nitrogen/phosphorus/potassium fertilizer the molar ratio of ammonia and phosphoric acid is typically kept between values of from 0.7 to 1.7. The dispersion of elemental sulphur and the ammonia are preferably mixed in step (b) in a pre-neutraliser or a pipe cross reactor. The ammonia is preferably supplied as anhydrous ammonia. The reaction of the phosphoric acid and the ammonia is exothermic and typically results in vigorous mixing in a pre-neutraliser or pipe cross reactor such that no further agitation is required. Residence time in a pipe cross reactor is preferably just a few seconds, e.g. 1-5 seconds. Residence time in a pre-neutraliser is likely to be longer, e.g. from 30 to 60 minutes. For the production of sulphur—nitrogen/phosphorus/potassium fertilizer it is necessary to incorporate potassium into the fertilizer. This can be achieved in step (b) by mixing the dispersion of milled elemental sulphur in phosphoric acid with ammonia and with a potassium salt. Alternatively, this can be achieved in step (c) by adding a potassium salt to the granulator unit. Also, this can be achieved in step (a) or before by adding a potassium salt (or solution thereof) before or during the wet milling.

In step (c) of the process of the invention, the mixture of elemental sulphur and further components is granulated in a granulator unit to provide granulated elemental sulphur fertilizer. The term "granulator unit" is used to describe a device for forming granules of fertilizer product. Commonly used granulators are described in Perry's Chemical Engineers' Handbook, chapter 20 (1997). Preferred granulators are drum granulators, paddle mixers (pug mills) or pan granulators. Preferably, the mixture is pumped and distributed on a rolling bed of material in a drum granulator. Optionally, water and steam can be fed to the granulator to control the temperature of the granulation process as needed. Optionally, recycled fertilizer particles may be added to the granulator unit. Recycled fertilizer particles add granulation and nucleating agents. They are obtained from the final fertilizer product. Suitably they have small particle sizes (so-called off-spec fines).

Other ingredients may be added during the manufacturing process to tailor the fertilizer products to their intended end-use. Examples include plant micro-nutrients such as boron, potassium, sodium, zinc, manganese, iron, copper, molybdenum, cobalt, calcium, magnesium and combinations thereof. These nutrients may be supplied in elemental form or in the form of salts, for examples as sulphates, nitrates or halides. The amount of plant micronutrients depends on the type of fertilizer needed and is typically in the range of between 0.1 to 5%, based on the total weight of the granules.

The granulated elemental sulphur fertilizer obtained in step (c) is preferably dried in a drying unit. In a preferred embodiment, the fertilizer is air-dried in the drying unit, thereby avoiding the need for additional drying equipment. Alternatively, drying units wherein heat transfer for drying is accomplished by direct contact between the wet solid and hot gases are used, thereby enabling a faster drying step. Typically, the drying unit is a rotary dryer.

Preferably the granulated elemental sulphur fertilizer granules are sorted on their size in a sorting unit to achieve a more uniform size distribution. Typically, oversized granules are crushed and returned to the sorting unit while undersized granules are returned to the granulator as so-called off-spec fines. A preferred size range for the fertilizer granules is from 1.5 to 5.0 mm, more preferably from 2 to 4 mm, expressed as the average diameter of the granules. The use of granules which fall within this range is more likely to enable a more even distribution of the fertilizer ingredients in the soil after applying the granules to the soil.

Furthermore it is preferred that the particle size and particle size distribution of the milled elemental sulphur in the dispersion provided in step (a) is controlled. Suitably and preferably, the particle size and particle size distribution are controlled by controlling one or more of: the size of slots in the stator, the size of slots in the rotor, the tip speed of the rotor, the energy input, and the physical-chemical properties (composition, temperature, viscosity) of the liquid.

The following non-limiting Examples are illustrative of the invention.

Preparation of Dispersion of Solid Elemental Sulphur in Phosphoric Acid

A dispersion mill, manufactured by Kady International (model OC-30, stainless steel, cooling jacketed, 20-60 gallons of working capacity, equipped with a 30 HP Drive and a variable frequency controller) was used to mill elemental sulphur. The dispersion mill was filled with 200-300 kg of 40-50% $P_2O_5$ commercial fertilizer grade phosphoric acid.

The unit was started at minimum speed, and the required amount, of solid sulphur pastilles (formed yellow bright chemical sulphur) was fed to the unit at a constant and fast pace, to make the targeted slurry concentration (10 to 60 wt. %, depending on the experiment).

Once all the sulphur was fed to the unit, the speed was increased to the planned value, and the chronometer was started to keep track of batch residence times. Data was registered during the residence time (e.g. current consumption, time, temperature, visual observations, etc). Also samples could be taken during the milling.

If a temperature limit had been set for a particular experiment, cooling water to jacket was started at that temperature (usually 50-80° C.; in the shown examples, when temperatures were not indicated, the temperature was set at 55-60° C.). In some cases during the milling process a viscosity modifier was used (calcium lignosulphonate, an anionic surfactant available from Borregaard-Lignotech (Rothschild, Wis., USA), in a proportion between 0.025 wt. % and 5.0 wt. % based on the weight of the slurry being formed.

Once the residence time was completed, the speed was reduced to the minimum, final samples taken, and the product transferred to an agitated holding tank (and further samples taken if required).

Control of Particle Size Distribution

The parameters of the process for preparing the dispersions of elemental sulphur in phosphoric acid were varied to provide different particle size distributions. Table 1A shows how varying the weight percentage of elemental sulphur, the speed of the rotor and the duration of the milling affects the particle size distribution:

TABLE 1A

Conditions:
% S in slurry/
Speed (Hz)/
Residence time (min)

| | % passing sieve, opening in μm | | | | | |
|---|---|---|---|---|---|---|
| | 500 | 212 | 150 | 106 | 75 | 53 |
| 10/30/10 | 86.1 | 43.2 | 31.8 | 23.4 | 16.4 | 10.0 |
| 10/30/30 | 99.2 | 67.1 | 51.9 | 39.0 | 30.4 | 21.8 |
| 10/45/20 | 100 | 89.5 | 73.9 | 59.5 | 49.5 | 39.9 |
| 10/45/50 | 100 | 98.9 | 85.4 | 68.6 | 54.2 | 42.6 |
| 10/55/20 | 100 | 97.4 | 82.3 | 63.3 | 58.7 | 36.7 |
| 10/55/50 | 100 | 99.9 | 96.5 | 79.6 | 63.7 | 48.4 |
| 15/55/50 | 100 | 100 | 96.1 | 80.3 | 67.0 | 55.0 |
| 25/55/50 | 100 | 98.8 | 88.6 | 75.3 | 63.1 | 54.3 |
| 30/52/18[(1)(2)] | 100 | 96.6 | 85.0 | 71.6 | 60.2 | 51.3 |
| 35/55/50 | 100 | 97.4 | 87.6 | 76.6 | 65.8 | 57.4 |
| 40/56/20[(1)(2)] | 100 | 92.8 | 81.6 | 70.6 | 61.3 | 53.2 |
| 50/53/25[(1)(2)] | 100 | 87.0 | 78.4 | 69.2 | 60.8 | 53.8 |
| 60/48/28[(1)(2)] | 99.9 | 76.8 | 69.2 | 62.3 | 56.6 | 51.6 |

[(1)]Energy consumption in kWh/ton sulphur processed was 70.9 (30/52/18), 68.2 (40/56/20), 63.8 (50/53/25) and 52.2 (60/48/28).
[(2)]Amount of viscosity modifier used in test: 0.9 wt. % (30/52/18), 1.2 wt. % (40/56/20), 1.5 wt. % (50/53/25) and 0.9 wt. % (60/48/28).

Preparation of Dispersion of Elemental Sulphur in Phosphoric Acid using Molten Sulphur Molten elemental sulphur was prepared in two flat-bottomed, steam-jacketed tanks (melters) having a working volume of 30 to 40 l; the melters were equipped with variable-speed agitators with two downward-thrust impellers on the shaft. The required amount of elemental sulphur (ES) pastilles (indicated in Table 1B below) was fed to the melters manually.

The same dispersion mill as used above (Kady OC-30) was filled with a predetermined amount (see again Table 1B) of phosphoric acid and/or water, which directly correlated to the amount of molten ES needed to achieve the desired ES percentage in the batch. The rotor of the dispersion mill was turned on and once the speed of the rotor had reached approximately half of the maximum, the addition of molten ES was started. The average molten ES addition time was under 2 minutes for 30% molten ES. Some experiments were conducted by direct addition of the sulphur while for one experiment (experiment VII) a distributor was used (a small cylindrical vessel with about 48 holes having a diameter of about 0.64 cm). After the addition of the molten ES, the grind time of the milling cycle began. Samples were collected at different time intervals (shown under grind time in Table 1B; example: experiments III and IV were taken at 18 and 40 minutes, respectively) throughout the duration of the tests to determine particle size distribution and viscosity of the phosphoric acid/molten ES mixture.

In another embodiment (experiments VI, VII and IX in Table 1B, the molten sulphur was added to an aqueous solution of phosphoric acid and left to "cure" (to convert the crystalline solid sulphur from one phase to other) during different times, from periods between 4 and 16 hours to determine the optimal phase conversion times under these conditions.

The results for the experiments I-X using molten ES are indicated in Table 1B below. As can be seen from Table 1B, the preferred embodiment when using molten elemental sulphur was experiment VII resulting in 59.6% of the ES particles passing 53 μm whilst at the same time a relatively low energy consumption (73.2 kWh/mT ES) was obtained.

TABLE 1B

| Experiment nr. | I | II | III* | IV* | V | VI | VII** | VIII | IX | X |
|---|---|---|---|---|---|---|---|---|---|---|
| Elemental Sulphur % in batch | 20% | 30% | 40% | 40% | 30% | 30% | 35% | 31% | 30% | 40% |
| Phosphoric acid [kg] | 245.9 | 221.1 | 194.8 | 194.8 | 221.1 | 221.1 | 208.2 | — | 221.1 | 194.8 |
| Phosphoric acid % [% of $P_2O_5$] | 52.4 | 52.4 | 52.4 | 52.4 | 51.9 | 51.9 | 51.9 | — | 51.9 | 51.9 |
| Water [kg] | 34.7 | 31.2 | 27.5 | 27.5 | 29.4 | 29.4 | 27.7 | 156 | 29.4 | 25.9 |
| Sulphur [kg] | 61.7 | 95.5 | 131.3 | 131.3 | 93.4 | 93.4 | 111.7 | 69 | 94.4 | 129.6 |
| Calcium Lignosulfonate [g] | 558.8 | 574.2 | 590.4 | 590.4 | 574.2 | 574.2 | 582.5 | 574 | 574.2 | — |
| Mixing Conditions | | | | | | | | | | |
| Grind time [mins] | 40 | 30 | 18 | 40 | 2 | 30 | 18 | 18 | 18 | 40 |
| "Cure" time [hrs] | — | — | — | — | — | 6 | 8 | — | 16 | — |
| Temperature (min/max) [° C.] | 39/44 | 46/50 | 52/59 | 52/59 | 46/47 | 37/61 | 38/60 | 31/59 | 29/60 | 63/69 |
| Viscosity [cP] | — | — | — | — | 750 | 88 | 163 | 5 | 50 | 2075 |
| Size Analysis of wet-milled ES (cumulative % passing) | | | | | | | | | | |
| 0.500 mm [%] | 99.9 | 99.8 | 96.2 | 99.8 | 80.5 | 99.8 | 100.0 | 100 | 100.0 | — |
| 0.212 mm [%] | 88.8 | 84.2 | 69.2 | 80.8 | 55.1 | 93.8 | 94.6 | 94 | 95.0 | — |
| 0.150 mm [%] | 79.8 | 74.0 | 58.5 | 69.8 | 48.1 | 85.5 | 87.4 | 88 | 88.0 | — |
| 0.106 mm [%] | 68.4 | 65.2 | 50.6 | 61.0 | 40.4 | 74.9 | 76.1 | 78 | 76.1 | — |
| 0.75 mm [%] | 60.3 | 58.5 | 43.8 | 54.5 | 34.3 | 65.0 | 66.6 | 72 | 65.5 | — |
| 0.53 mm [%] | 51.7 | 52.2 | 38.4 | 49.5 | 28.0 | 57.8 | 59.6 | 59 | 58.7 | — |
| Energy, kWh/mt ES | 302.3 | 150.8 | 64.7 | 144.0 | 10.8 | 139.8 | 73.2 | 92.9 | 87.4 | 154.5 |

*Experiments III and IV were same run; samples taken at different times (18 and 40 minutes)
**In experiment VII a distributor (cylindrical vessel with about 40 holes) was used to add the elemental sulphur.

Preparation of Elemental-Sulphur Containing Triple Superphosphate Fertilizer

Ground phosphate rock, a dispersion of elemental sulphur in phosphoric acid, defoamer and water were fed to an agitated premixing tank. Fertilizers were prepared from a range of dispersions (prepared as outlined above) having sulphur content from 10 to 30 wt. %, based upon the weight of the dispersion. The ground phosphate rock was metered using an AccuRate feeder, and a vibratory trough feeder conveyed the phosphate rock to a premixing tank. A peristaltic pump was used to feed the defoamer. The dispersion of elemental sulphur in phosphoric acid was pumped from a day tank to the premixing tank and was measured using a magnetic flow meter. The premixing tank overflowed by gravity directly into the reactor.

The reactor was equipped with a variable-speed agitator fitted with three axial-flow downward thrust turbines. A constant level was maintained in the reactor; the calculated working volume was 231 liters. To achieve the target slurry temperature in the reactor (about 100° C.), live steam was fed into the reactor through a pipe positioned at the same level as the bottom turbine on the agitator shaft. The residence time in the reactor was approximately 100 minutes.

An exhaust fan was used to remove the reactor gases through a spray-type scrubber to clean gases before exhausting them into the atmosphere. Water was used as the scrubbing medium. Part of the scrubber liquor was directed to the reactor to control the density of the slurry. The scrubber liquor for process control was metered and fed by gravity into the top of the reactor. The flow rate was manually checked.

The slurry from the reactor overflowed by gravity into a deep insulated cone and was transferred to a drum granulator by a positive-displacement, lobe-type, variable-speed pump. A long drilled stainless steel pipe with six 6 mm holes was used to distribute the slurry onto a rolling bed of recycle material in the drum granulator. A 15 cm retaining dam was located 61 cm from the discharge end of the granulator.

Gases drawn from the granulator area were treated with a venturi-type scrubber. The scrubbing system used water as the scrubbing media.

Moist, granular material from the granulator was discharged by gravity into a rotary dryer. The dryer was operated with co-current airflow and heated using a propane-fired combustion chamber located directly in line with the material inlet of the dryer. The operating temperature of the dryer was controlled indirectly by measuring the temperature of the air at the dryer discharge and adjusting the burner accordingly. During this activity, the dryer was operated at a rotational speed of 7 rpm.

A cyclone-type dust collector was located in the process air duct between the dryer discharge and the exhaust fan. An open-wheel centrifugal fan discharged the exhaust air into the atmosphere.

A centrifugal-type bucket elevator transferred the material from the dryer discharge to an inclined double-deck, mechanically vibrated screen system. The screen housing was fitted with a Ty-Rod oversize screen (4.00 mm opening) and a Ty-Rod undersize screen (2.36 mm opening) to produce a product material between 2.36 mm and 4.00 mm. Oversize material from the screen system was routed to a chain mill. The crushed material discharging from the chain mill was returned to the screen system. Undersize material from the screen system was returned to the granulator together with a controlled fraction of the product size material to maintain optimum granulation. The product-size fraction from the screen system was fed to a rotary cooler that was operated with co-current airflow.

The plant was equipped with a fugitive dust collection system. An open-wheel centrifugal fan discharged the exhaust air into the atmosphere.

Product-size material was collected in portable hoppers and later stored in 1-mt supersacks.

The dust collected in the cyclone-type dust collector in the fugitive dust collection system was analysed using a sulphur burner analyser to quantify the amount of sulphur in the dust. Table 2 shows the ratio of the amount of elemental sulphur in the dust to the amount of elemental sulphur in the fertilizer product, for both dust streams. Ratios are shown for the process of preparing elemental-sulphur containing triple superphosphate fertilizer according to the invention, and also for a comparative process wherein commercial powdered sulphur was used instead of the dispersion of elemental sulphur in phosphoric acid prepared using a dispersion mill. A range of ratios are given to show the results for a number of product runs:

TABLE 2

|  | Ratio between S content of dust in fugitive dust collection system outlet and S content of fertilizer product | Ratio between S content of dust in cyclone-type dust collector and S content of fertilizer product |
| --- | --- | --- |
| Process of the invention | 1.5-2.0 | 1.3-1.5 |
| Comparative process using commercial powdered sulphur | 1.8-3.3 | 1.4-2.0 |

It is desirable for the ratios to be as low as possible because dust containing high concentrations of elemental sulphur are potentially explosive. By reducing the amount of sulphur in the dust, the process of the present invention enables the skilled person to incorporate higher levels of sulphur in the fertilizer product without compromising safety.

What is claimed is:

1. A process for preparing an elemental sulphur-containing fertilizer, comprising steps of:
   (a) using a dispersion mill, wherein a rotor turns within a slotted stator, to wet mill elemental sulphur in a liquid, thereby providing a dispersion of milled elemental sulphur in the liquid;
   (b) combining the dispersion of milled elemental sulphur with further components to provide a mixture of elemental sulphur and further components; and
   (c) granulating the mixture in a granulator unit to provide granulated elemental sulphur containing fertilizer.

2. A process according to claim 1, wherein the dispersion mill has a slotted rotor inside a slotted stator.

3. A process according to claim 1, wherein the elemental sulphur is added to step (a) as solid sulphur.

4. A process according to claim 1, wherein one or more surfactants is added during step (a) or step (b).

5. A process according to claim 1, wherein the liquid in step (a) is an aqueous liquid selected from the group consisting of an aqueous solution of phosphoric acid, an aqueous solution of ammonium phosphate, an aqueous solution of ammonium sulphate and a combination thereof.

6. A process according to claim 5, wherein the elemental sulphur-containing fertilizer is a sulphur-triple super phosphate fertilizer, and in step (b), the dispersion of milled elemental sulphur in an aqueous solution of phosphoric acid is mixed and reacted with phosphate rock, thereby providing a mixture of sulphur and soluble calcium phosphate.

7. A process according to claim 1, wherein the elemental sulphur-containing fertilizer is a sulphur—monoammonium phosphate, sulphur diammonium phosphate or sulphur—nitrogen/phosphorus/potassium fertilizer, and in step (b), the dispersion of milled elemental sulphur in liquid is mixed and reacted with ammonia, thereby providing a mixture of sulphur and ammonium phosphate.

8. A process according to claim 1, wherein the particle size and particle size distribution of the milled elemental sulphur in the dispersion provided in step (a) is controlled.

9. A process according to claim 8, wherein the particle size and particle size distribution are controlled by controlling one or more of: the size of slots in the stator, the size of slots in the rotor, the tip speed of the rotor, the energy input, or the composition, temperature or viscosity of the liquid.

10. A process according to claim 3, wherein the particle size and particle size distribution of the milled elemental sulphur in the dispersion provided in step (a) are controlled by controlling one or more of: the size of slots in the stator, the size of slots in the rotor, the tip speed of the rotor, the energy input, or the composition, temperature or viscosity of the liquid.

11. A process for preparing an elemental sulphur-containing fertilizer, comprising steps of:
   (a) using a dispersion mill, wherein a slotted rotor turns within a slotted stator, to wet mill elemental sulphur, added to this step as solid sulphur, in a liquid, thereby providing a dispersion of milled elemental sulphur in the liquid;
   (b) combining the dispersion of milled elemental sulphur with further components to provide a mixture of elemental sulphur and further components; and
   (c) granulating the mixture in a granulator unit to provide granulated elemental sulphur containing fertilizer.

* * * * *